A. T. SAUNDERS.
RUBBER SOLE FOR SHOES.
APPLICATION FILED JAN. 4, 1918. RENEWED APR. 13, 1920.

1,361,907.  Patented Dec. 14, 1920.

Inventor:
Addison T. Saunders,
by Spear, Middleton, Donaldson & Spear,
Atty's.

UNITED STATES PATENT OFFICE.

ADDISON T. SAUNDERS, OF CHICOPEE, MASSACHUSETTS, ASSIGNOR TO A. G. SPALDING & BROS., OF JERSEY CITY, NEW JERSEY, A CORPORATION OF NEW JERSEY.

RUBBER SOLE FOR SHOES.

1,361,907.   Specification of Letters Patent.   Patented Dec. 14, 1920.

Application filed January 4, 1918, Serial No. 210,318. Renewed April 13, 1920. Serial No. 373,538.

*To all whom it may concern:*

Be it known that I, ADDISON T. SAUNDERS, a citizen of the United States, and resident of Chicopee, Massachusetts, have invented certain new and useful Improvements in Rubber Soles for Shoes, of which the following is a specification.

My invention relates to stiff shank rubber soles of the general character disclosed in application for Letters Patent of the United States filed by me August 7, 1917, Serial Number 184,951, and to the method and means for making the same, the article of my present invention being an improvement upon that disclosed in said application.

The invention consists in the features and combination and arrangement of parts hereinafter described and in the method and apparatus as pointed out in the claims.

In the accompanying drawing.

Figure 1:
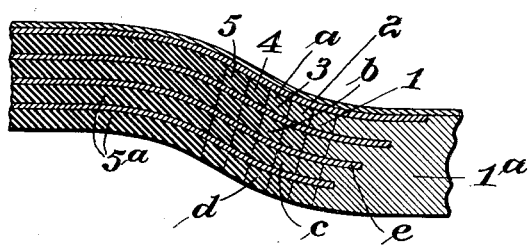
Figure 1 is a longitudinal sectional view of a portion of a rubber sole made according to my invention, the view illustrating the shank portion of the shoe with so much of the tread and heel portion as is necessary to a clear understanding of the structure.

One embodiment of the generic features of my invention is shown in Fig. 1 in which 1ª is the tread portion of the sole which is of such a compound as will be flexible when vulcanized. The shank portion is made up of layers as at $a$, $b$, $c$, $d$ and each of these layers is made up of portions 1, 2, 3, 4 and 5, the portion 1 joining the tread 1ª and the portion 5 joining the upper part of the arch at 5ª. These portions 1, 2, 3, 4, 5 are graduated as to the character of their compounds, so that the portion 1 will vulcanize harder or stiffer than the tread 1ª, the portion 2 will be stiffer than the portion 1, and so on throughout these laminations, the rear end portion 5 of each layer being of the harder vulcanizable compound in respect to the portion 4 and slightly less stiff when vulcanized than the main body 5ª.

These layers each made up of the graduated portions 1 to 5 may be produced in various ways but in Fig. 3 I indicate one method of making them, that is to say, I lay one upon another a series of strips or sheets of a width equal approximately to the width of the shank portion of the sole the upper layer, being of the softer vulcanizable compound, the next below of a compound that will vulcanize stiffer than the top layer and so on progressively to the lower layer, which is of the stiffest vulcanizable material. These layers or strips are united and the mass thus produced is cut transversely on the dotted lines, thus making strips of a length equal to the vertical thickness of the mass shown with the graduated vulcanizable portions 1, 2, 3, 4 and 5 attached to each other, and these sheets or strips are then laid as indicated in Fig. 1, and when vulcanized together with the portions 1ª and 5ª there will be produced a sole having a flexible tread and a shank which is progressively stiffer from the portion 1ª to the portion 5ª. The extent to which this graduation is carried out may be varied but for the best effect the number of portions of different compounds should be such that the strain of flexing will not be brought at any one point, such as would be the case were a soft vulcanizable material for the tread joined to a portion whose compound would vulcanize hard enough to produce the desired stiffness in the arch.

With the graduated compounds a more endurable union or connection of the stiff shank with the soft tread is produced, than were the hard and soft compounds united without the interposition of the compound of intermediate capacity to harden or stiffen, and further the cohesion of the compounds is more complete, the nearer the two in juxtaposition are alike in character as to curing.

In carrying out the invention the stiffening of the arch or shank in some degree is carried to a point as near to that at which the tread leaves the ground, as is consistent with the desired blending of the compounds or the distribution of the strain in flexing.

As in the application above referred to, or in that filed by me November 17, 1917, Serial Number 202,545, I may employ layers of fabric as shown at *e* between layers of rubber compound to strengthen the arch, but these fabric layers become of less importance when the sole embodies my improvements above noted involving the transition in degree of stiffness from the tread to the arch or portion at the top of the arch, and it therefore will be understood that the fabric layers may be omitted.

In making up the sole I may first lay a strip or layer of rubber coated fabric as in my application first above noted or in my application #202,545. In proceeding to lay up the material for the sole of Fig. 1 I take a piece of the tread compound 1$^a$ adapted to fit the mold in its forward portion and extending back to the position of the portion 1. A section or strip composed of the portions 1, 2, 3, 4, and 5 is then placed in the mold with the portion 1 abutting the rear end of the layer first placed and then a layer of the material 5$^a$ is placed abutting the portion 5, this last placed piece being of a character to secure stiffness in vulcanizing.

The first complete layer having been placed the other layers are produced by repeating the above process until sufficient material has been placed in the mold to produce a sole of the desired thickness.

Figure 3:
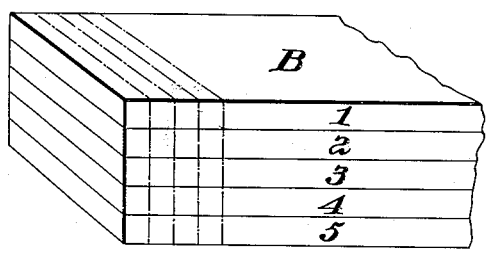
Fig. 3 illustrates material built up of layers of stock or compounds graduated as to their varying degrees of stiffness resulting from difference in the factors of character of materials, duration of cure, and temperature, these laminations being severed on the dotted lines and employed in building up the arch or shank portion of the sole as will be hereinafter described.

When the interlaminations of fabric are employed the layers made up of the portions 1 to 5 are of course cut thinner from the mass shown in Fig. 3.

Instead of making up the layers *a*, *b*, *c*, *d* by cutting them from a mass of layers of different vulcanizable compounds I may make said layers of graduated compounds by forming a sheet upon the calender made up of narrow strips of the different compounds, these strips differing as to the vulcanizable character of their compounds to produce the desired graduated effect. These various strips are delivered upon the rolls side by side from a battery of tubes and they are united edge to edge by the rolling action into a continuous sheet, which upon being cut crosswise of the strips will produce the pieces like *a* made up of the portions 1 to 5, ready for laying up in the mold.

Again in the case of soles to comprise rubber coated fabric in laminations, I may deliver from tubes or hoppers arranged side by side, graduated compounds in the form of the usual cements upon the fabric, the different compounds meeting with each other along their edges and when cut transversely of the parallel strips of material the composite laminations thus produced may be interspaced in the mold with rubber compound layers in building up the shank.

Figure 5:
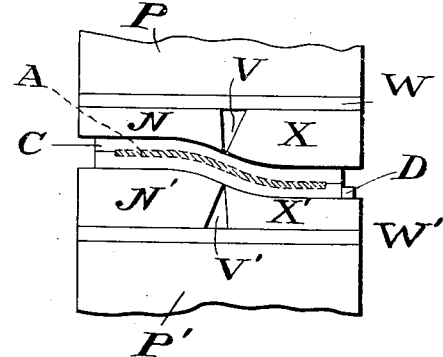
Fig. 5 is a side view of the mold, the platens operating thereupon and a portion of the hydraulic press of substantially ordinary form employed in carrying out my method.

The mold employed may be of the form indicated at C, Fig. 5, which, instead of the flat type usually employed having its upper and lower flat sides contacting with the platens conforms roughly in shape to the curve of the sole to be cured. This enables me to dispense with the extra metal which would be required to fill out the faces of the mold to a level and thereby enables quicker heating and cooling. I employ specially formed platens as shown in Fig. 5 at N, X; N', X' conforming on their adjacent faces to the curved shape of the mold. W, W are layers of asbestos or other insulating material usually employed to prevent diffusion of the heat of the platens to the press heads. The platen sections are divided from each other by the angular shaped spaces V. These may be left as air spaces or they may be filled with heat non-conducting material as asbestos.

These platen sections at one edge i. e. adjacent the mold surfaces may be touching or slightly separated from each other.

Figure 2:
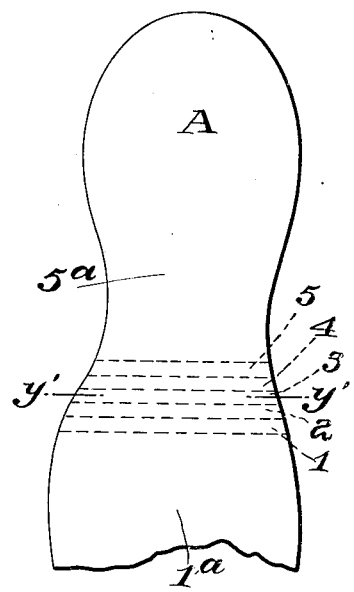
Fig. 2 is a plan view of a part of a sole embodying my invention.
Figure 4:
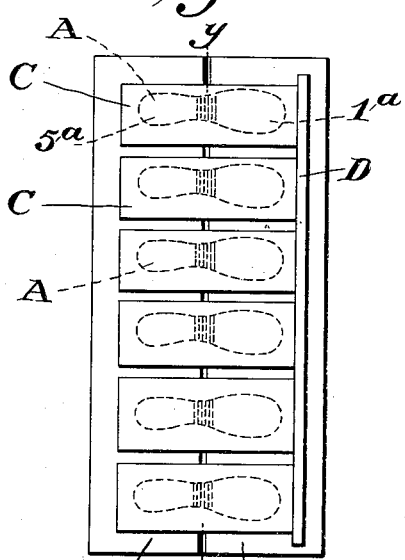
Fig. 4 is a plan view of part of an apparatus employed in carrying out my method.

The purpose of this sectional formation of the platens is to permit the application of different temperatures to the two portions of the molds on opposite sides of the plane of the break or space V, or the opposite sides of the line $y$—$y$ in Fig. 4, the position of which relative to the sole is indicated in Fig. 2 by the line $y'$—$y'$.

The different temperatures of the platen sections may be secured by means of the usual "reducers" or controllers, interposed between the steam supply and the leads to the platens.

The platen sections N, N' are connected with the leads carrying the higher pressure and X, X', with the leads carrying the lower pressure.

It, therefore, will be seen that the higher temperature acts upon that part of the mold containing the heel and shank portion of the sole, while the lower temperature is delivered to the part containing the tread portion. Further it will be understood that by diffusing a graduated merging of the two temperatures will take place as between the hotter sections N, N' and the sections X, X' of lower temperature and this graduated temperature will be imparted to the sole through the mold, along the region of the shank or arch.

By varying the thickness of the mold to suit the width of the graduated compound area I secure a proper curing temperature for every part of the various compounds.

If desired the heel portion of the sole may be laid up of a softer curing compound than the shank, in which case the platens of the press may be further divided, so that a lower temperature may be delivered to the heel portion of the mold through the platen sections divided off from the sections opposite the shank.

In the use of the apparatus the sole "biscuits" are placed in the molds C, as at A, Fig. 4, said molds resting on the sections N', X' of the lower platen and against the stop rib D by which the molds are properly lined up in respect to the platen sections, so that the shank portion of the sole will lie in the desired relation to the split in the platen for the proper heating effect above noted, this lining up of the molds also bringing them in position to insure proper contact therewith of the platen, thus avoiding damage thereto.

When the molds are properly placed the press is closed upon them in the usual way and the heat applied.

From the foregoing it will be understood that the portion 5ᵃ of the sole is made of a compound requiring a higher temperature in vulcanizing than the portion marked 1ᵃ, for a given length of time and that the strips of graduated compounds between the heel portion and the tread i. e. the portions 1, 2, 3, 4 and 5 of Figs. 1 and 2 should receive heat graduated from the lower at 1 to the higher at 5.

In some special styles or sizes I may even alter the order of arrangement of the graduated series of compounds laid between the compound for the arch and that for the tread. To illustrate; for molding a child's sole, having but little arch, a thin, flat mold may be used, and the heat from the two sections of the platen may overlap—that is to say, the cooler (less heated) platen may not hold the temperature of the mold down, up to the very point of juncture with the hotter platen, to its own temperature—the hotter platen prevailing somewhat beyond this juncture by diffusion through the mold, and the portion of the mold in contact with the hotter platen may not, near the point of juncture with the cooler, maintain quite its equal temperature. In this case a slightly softer curing, or slower curing compound may be required for that portion of the tread which comes near to this juncture, in order to get a tread of equal quality throughout, and a quicker curing compound also be required for a short portion of the tread nearest this juncture. This may be obviated by placing the molds so that the juncture of the two platens (two pairs) falls sufficiently beyond the point of union of the tread portion and the sole portion in the direction of the heel of the sole to give the tread the even heat, and let the forward slight length of the shank subject to the less heat run slightly soft, since in children's shoes (soles) the maximum stiffness is not essential, because of the slight weight imposed upon them.

While I have shown, as in my original case, the manner of laying up a sole as beginning with the attaching surface when laminated, it may be found desirable in some styles to lay the tread face first, reversing the molds or adapting the closing of same to this arrangement.

As stated in my application above referred to No. 184,951, I may dust upon the layers as the shank is built up an accelerator material so graduated as to the amount of the deposit that the graduated degree of hardness will be obtained in the finished product throughout the shank portion.

The relative stiffness between the shank and tread or between different parts of the shank can be secured by graduating the character of the material while the heat may be of the same degree as applied to the different parts and the duration of the cure may be the same throughout, or the result can be produced in a degree by having the same material and degree of heat throughout, the duration of cure alone being varied in relation to the different portions of the sole or the same character of material may be used throughout and the same duration of cure but different temperatures may be used for the different parts.

For the maximum difference in stiffness between the tread and shank at least two of the factors above mentioned are required if the best quality is to be had.

What I claim is:

1. A sole for footwear comprising rubber vulcanized to different degrees of hardness in respect to its tread and arch, the tread being flexible and the arch progressively stiffer rearwardly from its point of junction with the tread, substantially as described.

2. A sole for footwear comprising rubber laminations vulcanized to different degrees of hardness in respect to its tread and arch, the tread being flexible and the arch progressively stiffer rearwardly from its point of junction with the tread, substantially as described.

3. A sole for footwear comprising rubber with fabric laminations, to stiffen the arch, the rubber being vulcanized to different degrees of hardness in respect to its tread and arch, the tread being flexible and the rubber of the arch being progressively stiffer rearwardly from its point of junction with the tread, substantially as described.

4. A sole for footwear having a tread comprising rubber compound and a rubber compound shank continuous with said tread, said shank rubber being made up of a plurality of contiguous portions following each other from the front rearwardly and of different degrees of stiffness.

5. A sole for footwear having a tread composed of flexible rubber compound and a shank continuous with the tread and of a stiffer compound, the shank at the point where it merges into the tread being less flexible than the tread, but relatively flexible in respect to the other portions of the shank, substantially as described.

6. A sole for footwear composed of a flexible rubber compound tread and a stiffer shank, said shank comprising layers or strips continuous with the tread, and composed of transverse belts or strips of rubber of different stiffness increasing toward the rear, substantially as described.

In testimony whereof, I affix my signature.

ADDISON T. SAUNDERS.